United States Patent [19]

Crane et al.

[11] 4,190,820
[45] * Feb. 26, 1980

[54] SIGNAL TRAIN VERIFICATION SYSTEM USING LANDMARKS

[75] Inventors: Hewitt D. Crane, Portola Valley; Daniel E. Wolf, Menlo Park, both of Calif.

[73] Assignee: Stanford Research Institute International, Menlo Park, Calif.

[*] Notice: The portion of the term of this patent subsequent to Apr. 25, 1995, has been disclaimed.

[21] Appl. No.: 898,997

[22] Filed: Apr. 21, 1978

Related U.S. Application Data

[63] Continuation-in-part of Ser. No. 716,344, Aug. 20, 1976, Pat. No. 4,086,567.

[51] Int. Cl.$^2$ .............................................. G06K 9/00
[52] U.S. Cl. ................... 340/146.3 SG; 340/146.3 SY
[58] Field of Search ............ 340/146.3 SY, 146.3 SG, 340/146.3 Q, 146.3 H

[56] References Cited

U.S. PATENT DOCUMENTS

| | | | |
|---|---|---|---|
| 3,699,517 | 10/1972 | Dyche | 340/146.3 SY |
| 3,930,229 | 12/1975 | Crane et al. | 340/146.3 SY |
| 3,962,679 | 6/1976 | Engelbrecht | 340/146.3 SY |
| 4,086,567 | 4/1978 | Crane et al. | 340/146.3 SY |

*Primary Examiner*—Joseph M. Thesz
*Attorney, Agent, or Firm*—Freilich, Hornbaker, Wasserman, Rosen & Fernandez

[57] ABSTRACT

When trains of signals, derived from a written template signature, are to be compared directly with trains of signals, derived from a written specimen signature, because no two written signatures are identical, there is a requirement for providing a certain degree of "rubberiness" between the specimen and template signals. Previously, such rubberiness was achieved by breaking up the trains of signals into fixed portions and then conducting translation, stretch and contraction between these fixed portions in the course of the comparison. In this invention, advantage is taken of the existence of prominent landmarks in the trains of signals of the template and specimen signatures. The trains of signals are broken into segments by these landmarks. Segments of the specimen are stretched or contracted and translated to match corresponding segments of the template, to greatly simplify and enhance correlation process.

12 Claims, 9 Drawing Figures

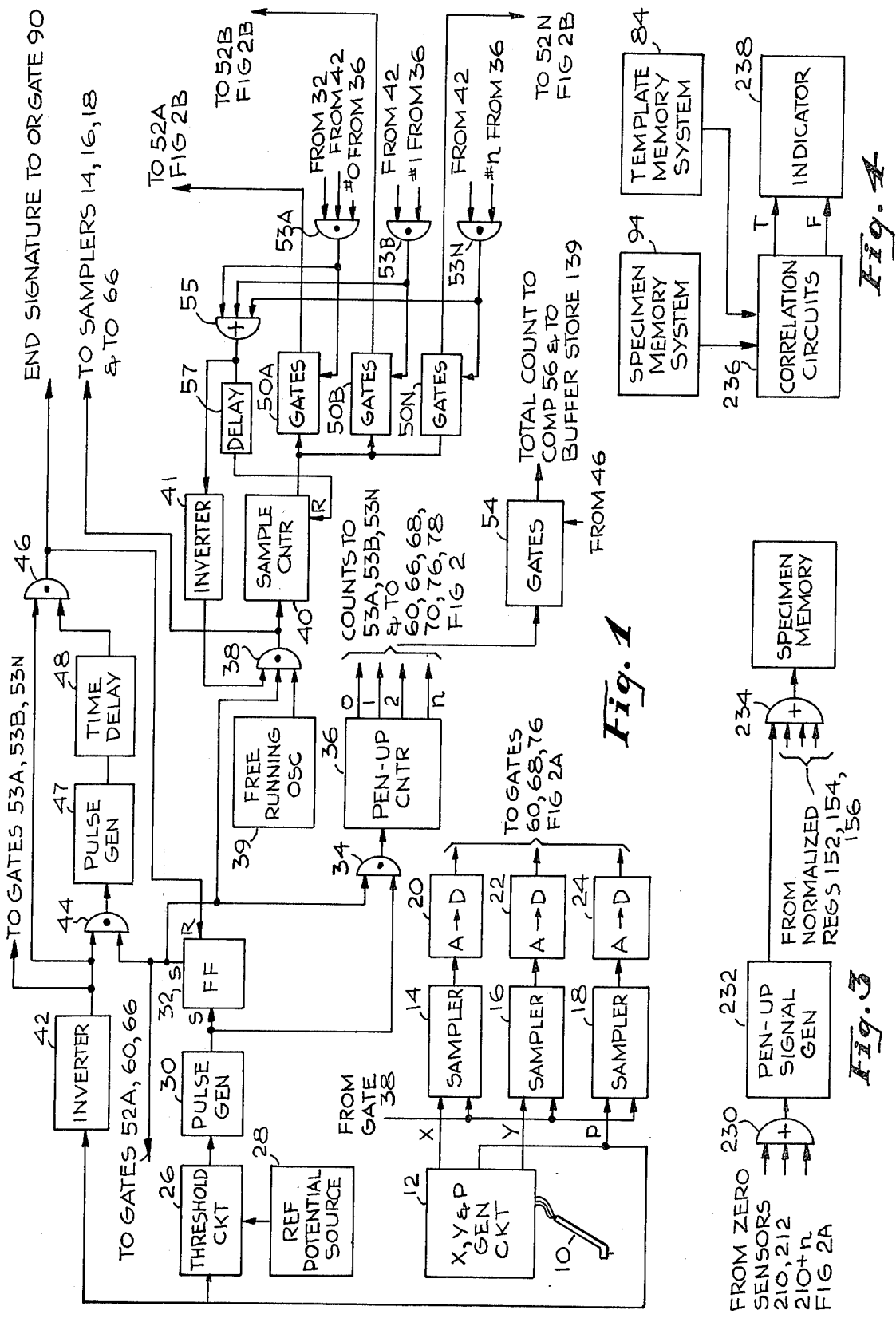

Fig. 2A

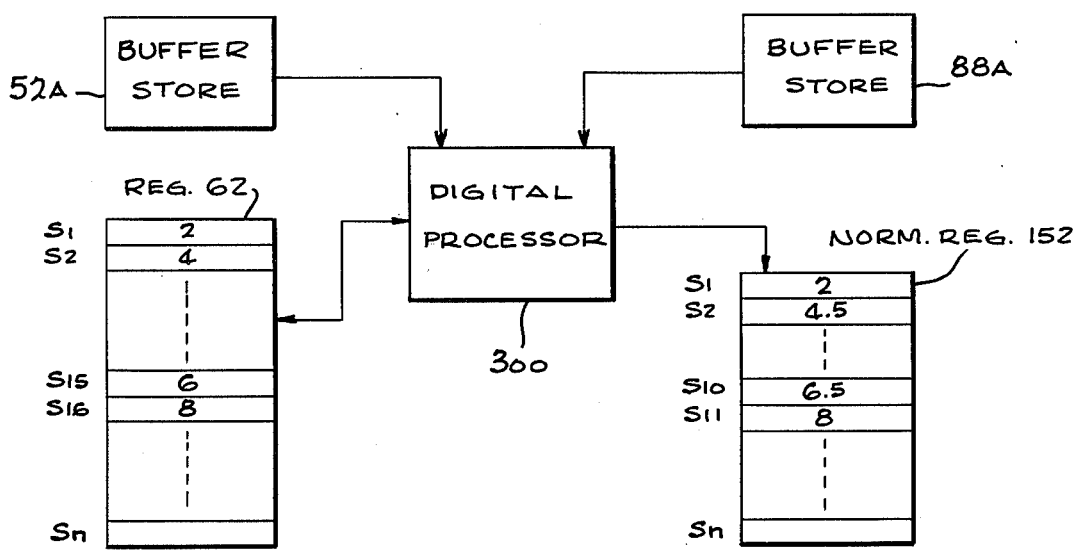
FIG. 6
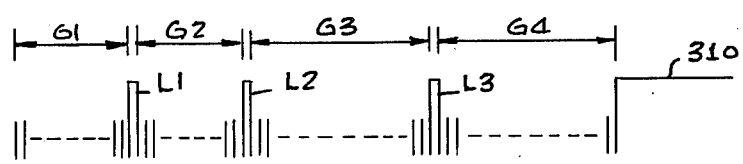
FIG. 5
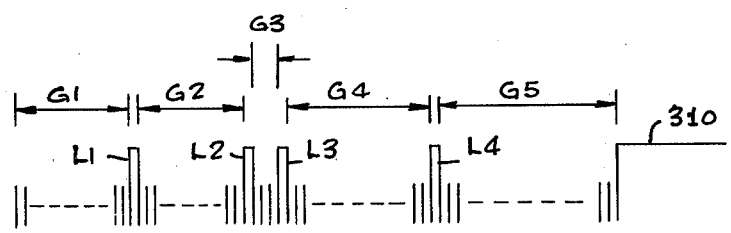
FIG. 7a
FIG. 7b

SIGNAL TRAIN VERIFICATION SYSTEM USING LANDMARKS

CROSS-REFERENCE TO OTHER APPLICATIONS

This application is a continuation-in-part of application Ser. No. 716,344, filed on Aug. 20, 1976, now U.S. Pat. No. 4,086,567.

BACKGROUND OF THE INVENTION

This invention relates to systems used for signature verification and more particularly to improvements therein. In an application, Ser. No. 681,118, now U.S. Pat. No. 4,040,012, entitled Handwriting Verification System, by Crane et al, and assigned to a common assignee, there is described a system for comparing signature-derived signals. Included in the correlation process is a method and means for achieving a certain degree of rubberiness between signals derived from specimen and template signatures. The rubberiness is achieved by breaking the signals into fixed portions, or segments, such as halves or thirds, and then performing a stretching and contracting operation between corresponding halves or thirds. The signals are not examined for any particular features—the process of segmentation is blind. In other words, it is performed independent of the nature of the signals. Where there are no explicit landmarks in the signal, this process is very useful. However, if the signature-generated signals have prominent landmarks, and if advantage can be taken of their presence, the operation of stretching or contracting the portion of specimen signals between each pair of landmarks for subsequent correlation can be made much simpler, more economical, as well as increase the system's accuracy.

OBJECTS AND SUMMARY OF THE INVENTION

An object of this invention is to provide a novel method and means for processing specimen signals for comparison with template signals.

Another object of this invention is the provision of a method and means for enabling signature derived specimen signals to be divided into segments between prominent landmarks and stretching or contracting the segments as required.

The foregoing and other objects of the invention are achieved by generating signals, as a specimen signature is being written, such as a pressure force, P, representative of the force exerted by a pen, perpendicular to the plane of the paper, a left-right force, X, in the plane of the paper, and a near-far force, Y, in the plane of the paper. These signals are sampled at a suitable sampling frequency and the samples are converted to digital sample signals, or simply digital samples. Prominent landmarks in the signals, such as the occurrence of "pen-ups", which take place when the pen is lifted from the paper during the course of the signature writing, are utilized for segmenting the train of digital samples, which are derived from the specimen signature. Each sequence of digital samples, occurring between pen-ups is directed to a different register. The number of pen-ups, occurring during the writing of the specimen signature are counted and compared with the number of pen-ups, which occur during the writing of the template signature. If they are the same, then each segment of the specimen signature, which is stored in a separate register, is "normalized" or stretched or shortened, as required, to correspond to the length of the segment between pen-ups in the template signature. Thereafter, the template digital samples between segments may be compared with the stretched or reduced specimen signature digital samples by any desired correlation technique.

The novel features of the invention are set forth with particularity in the appended claims. The invention will best be understood from the following description when read in conjunction with the accompanying drawings.

BRIEF DESCRIPTION OF THE DRAWINGS

FIG. 1 is a block schematic diagram of a system for generating X, Y and P signals from the signature being written, as well as determining landmark signals;

Figure 2A:
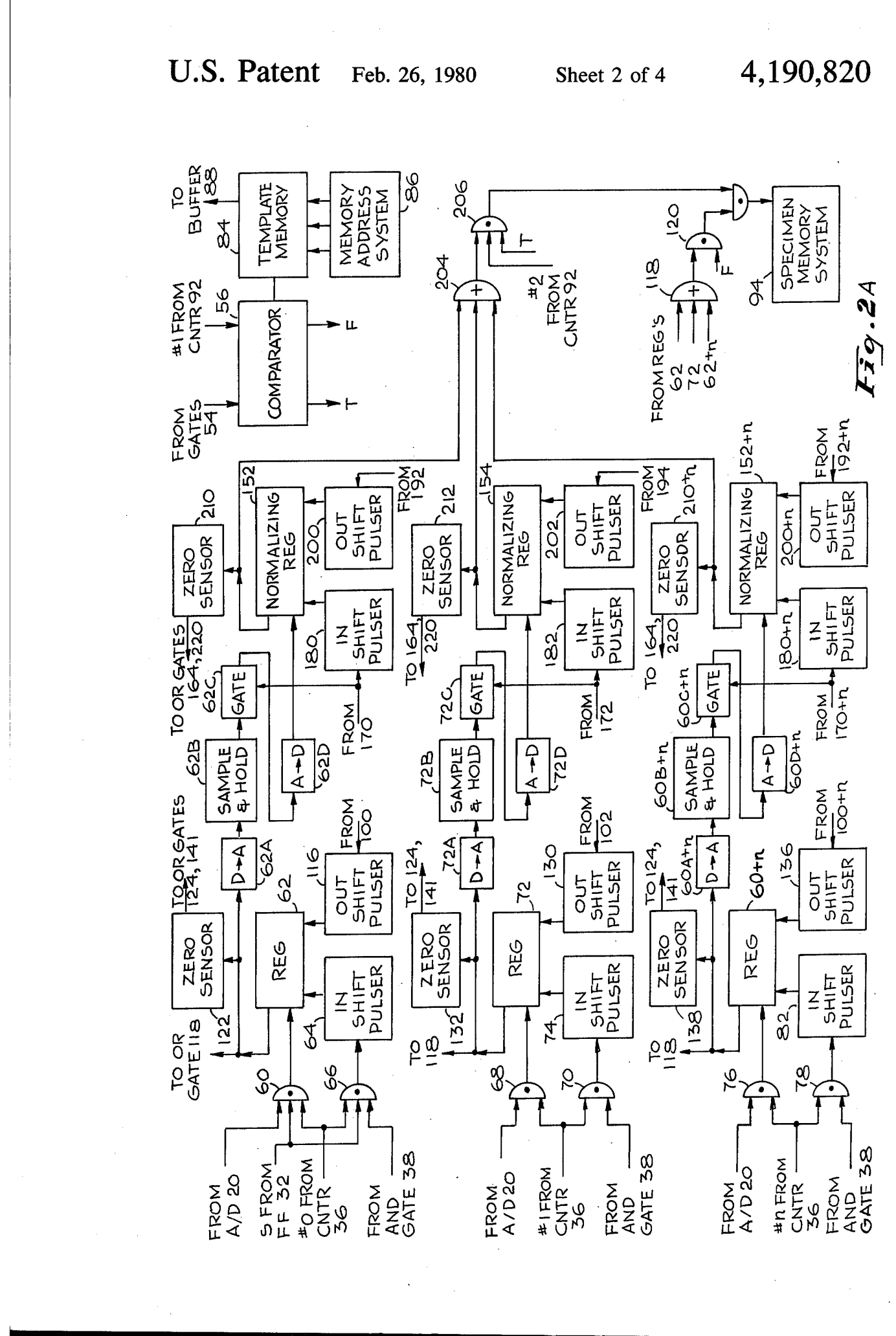

FIGS. 2a and 2b are block schematic diagrams of arrangements for expanding or contracting the digital signal trains between landmark signals in the specimen derived from the specimen signature;

FIG. 3 is a block schematic diagram indicating how the digital signal train derived from the specimen signature can have landmark signals inserted therein to assist in subsequent processing;

FIG. 4 is a block schematic diagram illustrating how the process specimen signals can then be processed through correlation circuits for comparison with the template signals.

FIG. 5 is a multicolumn table useful in explaining several normalization examples;

FIG. 6 is a single block diagram of another normalization arrangement; and

FIGS. 7a and 7b are diagrams useful in explaining another aspect of the invention.

Figure 2B:
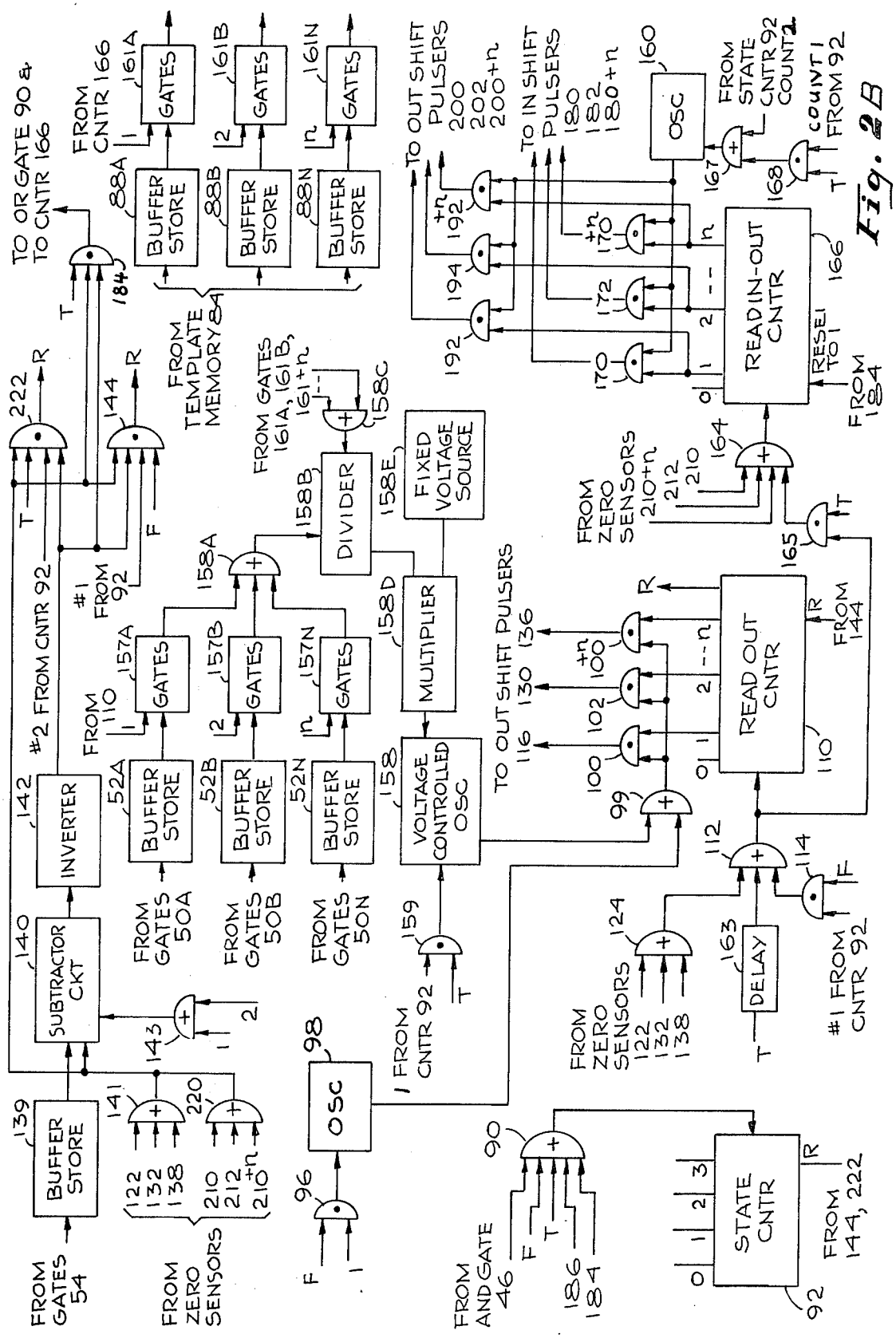

For explanatory purposes only, the present invention will be described in connection with an arrangement whereby several, e.g., three sequences of signals, are generated as a signature, whether the template or specimen, is written. These signals may be pressure and/or force signals designated by P, X and Y in FIG. 1, which may be provided by a pen such as the one described in U.S. Pat. No. 3,915,015. It should however be appreciated that more or less than three trains of signals may be generated. Also the term "signature" is not intended to be limited to the writing of a person's name. It is intended to include any written indicium. Also, as will be appreciated, the invention may be used to verify any train of signals which is segmented by landmarks with a particular train of signals, e.g., an acoustic signal train.

The circuitry, shown in FIG. 1, may be used for recording a template signature as well as for recording a specimen signature, which is to be compared with the template signature for verification. A pen 10, and signal generating circuit 12, which are associated therewith, are assumed to produce X, Y and P trains of signals, which are respectively representative of the direction forces and pressure. These are assumed to be analog signals which are respectively applied to three sampler circuits, respectively 14, 16 and 18. These sampler circuits, are periodically enabled, to sample the signals applied to their inputs, in response to pulses, received from a free-running oscillator, as will be subsequently described. The sampled signals or samples, which constitute the outputs of the respective sampler circuits 14, 16 and 18 are respectively applied to analog to digital converting circuits 20, 22 and 24 (A/D), to provide digitized samples. The outputs of the three A/D circuits are transferred to a plurality of registers, in a manner which will be subsequently described herein.

The P signal, provided by the generating circuit 12, is applied to a threshold circuit 26. The threshold circuit measures the amplitude of the P signal against a preestablished reference potential, provided from a reference potential source 28. If the P signal exceeds the reference potential signal, the threshold circuit 26 applies an output to a threshold pulse generator 30, which produces a signal pulse in response thereto. The pulse generator output sets a flip flop 32 and is also applied to a gate 34, which receives an enabling input from the set(s) output of the flip flop 32. The output of the gate 34 is applied to a pen-up counter 36.

As will be subsequently described, flip flop 32 remains set until the end of a signature writing. Each time the pen 10 is lifted from the paper and, within a predetermined interval, the pen is again applied to the paper, pulse generator 30 will provide an additional pulse. Thus, by counting the number of pulse outputs from pulse generator 30 during a signature writing, one can determine how many times the pen was lifted during the signature writing. Accordingly, at the end of a signature writing, the pen-up counter 36 will contain a total count equal to the number of pen-ups that occurred during the signature writing.

The set output of flip flop 32, together with the output of an inverter 41, enables a gate 38. The output of a free-running oscillator 39, is then applied through gate 38 to a sample counter 40, and also to the sampling circuits 14, 16 and 18, whereby they can sample the respective X, Y and P signals.

The P output of the generating circuit 12 is also applied to an inverter 42, the output from which is applied to two And gates, respectively 44 and 46. Gate 44 is enabled when flip flop 32 is transferred to its set condition. Accordingly, when this occurs the output of the inverter 42, in response to a P signal, is applied to a pulse generator 47. The pulse generator 47 generates a pulse which is applied to a time delay circuit 48. Should an enabling output from the inverter 42 still be present at the end of the delay, provided by time delay circuit 48, And gate 46 provides an output which can be considered as an "end of signature" output. This is used to reset the flip flop 32. The time delay 48 establishes an interval between its input and output, which is sufficiently long, so that pen-ups, such as those occurring when moving between words, or characters or partial characters or when crossing t's or dotting i's will transpire before that interval. Only when the pen has been lifted for a reasonably long time, to indicate that the signature writing has been terminated, is an output received from the time delay circuit 48.

It should be noted that the inverter 42 will provide an output each time the pen is lifted from the paper, whereby gates 44 and 46 will have a signal applied thereto. In the presence of an output from And gate 46, flip flop 32 is reset whereby And gates 34 and 38 are no longer enabled.

The output of the sample counter 40 is applied to as many sets of gates as there are signature segments which will be handled by the system. Three sets of gates, respectively 50A, 50B, 50N, are shown by way of example. The gates are successively enabled to transfer the counts of the sampler counter 40, applied to their inputs, respectively to buffer storage circuits respectively 52A, 52B, 52N (FIG. 2b) in response to outputs from respective And gates 53A, 53B, 53N. These And gates are successively enabled to provide outputs in response to successive counts 0,1,2,n from pen-up counter 36 and the output from inverter 42, which occurs whenever pen 10 is lifted. And gate 53A also requires a set output from flip flop 32. An Or gate 55 receives an output from each one of the And gates 53A, 53B, 53N and applies this output to the inverter 41 and to a delay circuit 57. The output of the delay circuit resets the sample counter. Inverter 41, in the presence of the input from the Or gate 55, inhibits And gate 38 from passing further outputs from the oscillator 39.

From the foregoing it should be understood that the sample counter 40 counts the number of samples taken of a signature between pen-ups. Once writing has commenced, when the pen is first lifted from the paper, inverter 42 will provide an output signal and the pen-up counter 36 will still be in its zero state. Gates 50A are enabled to transfer the count of sample counter 40 to buffer store 52A, and after a delay by delay circuit 57, long enough to permit this count transfer to take place, the sample counter is reset. When the writer again applies pen 10 to the paper or any other writing medium, the inverter output drops, And gate 38 is enabled to pass pulses from oscillator 39, and the sample counter 40 starts counting the number of samples taken of the signature until the next pen-up occurs. At this time, the pen-up counter will contain a 1 count. And gate 53B is enabled and the count in the sample counter is transferred to buffer store 52B. The sample counter is then reset and will start counting the number of samples in the next signature segment as soon as the pen 10 is applied for writing again. The foregoing sequence of transfer of the number of samples taken for each signature segment to a separate buffer store occurs until the signature is completed.

The total count of the pen-up counter 36 is applied to a set of gates 54 which are enabled to transfer this count to a comparator 56 (FIG. 2a) and to a buffer store 139 (FIG. 2b). The individual counts of the pen-up counter, besides being applied to And gates 53A, 53B, 53N as described, are applied to And gates 60, 66, 68, 70, 76 and 78, as will be described subsequently.

Referring now to FIGS. 2a and 2b, there may be seen a block schematic diagram of circuits for processing the digital samples provided by the outputs of the A/D circuits respectively 20, 22 and 24. Because the processing circuits required are identical for each train of digital samples, only one set of these circuits, is shown. FIGS. 2a and 2b, with exceptions which will be noted, are required for processing the digital samples from each one of the outputs of the A/D circuits.

Referring now to FIG. 2a, in response to the zero count output of the pen-up counter 36 and the set output of flip flop 32, an And gate 60 is enabled to permit the output from the A/D converter 20, which are the X digital samples, to be entered into a shift register 62. Pulses for shifting these samples into the register 62 are generated by an "in shift pulser" 64. The in shift pulser is a pulse shaping circuit, which is enabled to produce shift pulses in response to the output of an And gate 66. This And gate is enabled by the zero count output from counter 36 and the set output of flip flop 32, and serves to apply the sample pulse outputs from And gate 38 in FIG. 1, to the in shift pulser.

When the pen-up counter reaches its first count (count #1) this is applied to And gates 68 and 70. And gate 68 is thus enabled to transfer the digital samples from the A/D converter 20 to a second register 72. The register is enabled to enter these X samples in response to shift pulses, received from an in shift pulser 74. The in shift pulser receives the sample pulses from the output of And gate 38 through And gate 70.

It should be appreciated that each pen-up signal enables a succeeding segment of X digital samples, extending until the next pen-up signal, to be entered into a separate register, whereby the segments between pen-ups are separated. The nth count from counter 36 enables two And gates 76 and 78, whereby the nth segment of the samples from A/D circuit 20 is entered into a register (60+n) in response to shift pulses received from the in shift pulser 82. In shift pulser 82 receives the sample pulses from And gate 38 through an And gate 78.

A template memory 84, will have previously stored therein digital samples of the X segments of the template signature. These will be stored as separated segments and associated with each segment there will be a number indicative of the total number of samples that were taken during the writing of that segment. Another number will be stored for the total signature which will be the number of pen-ups that occurred during the writing of the template signature. The same circuit as is shown in FIG. 1 may be used for generating this data.

The template memory 84 is addressed by a memory address system 86, to which is applied the address of the template signature and associated numbers, prior to or during the writing of the specimen signature. Such addressing may be done in any of the well-known ways, such as by applying an identification number to the memory system, either by means of a keyboard or a card, which is read. Techniques for doing this, that is, for storing data in a memory and for addressing the memory for read-out of that data, is old and well-known by now, and therefore, it will not be described in detail here. Suffice to say that at this time the only data that is required from the template memory is the number of pen-ups which is read into the comparator 56, and the number of samples in successive segments of the template signature which are successively entered into respective template sample buffer circuits 88A, 88B, 88N (FIG. 2b), for temporary storage therein. The indicated information should be non-destructively read out of the memory.

It should be appreciated that buffer stores 88A, 88B, 88N correspond to buffer stores 52A, 52B, 52N in which the number of samples taken of corresponding segments of the specimen signatures are stored. The end signature signal of And gate 46 is applied to an Or gate 90, (FIG. 2b). The output of the Or gate 90 is applied to a state counter 92 causing it to go into a one-count state. The one-count state of state counter 92 is applied to the comparator 56 to enable it to compare the total number of pen-up signals which occurred in writing the template signature with the total number of pen-up signals occurring during the writing of the specimen signature. If the pen-up counts are equal the comparator will produce a "true" output (T). If the two pen-up counts are not equal, it will produce a "false" (F) output.

Several alternatives may be pursued in the event that a "false" output signal occurs. This may be displayed by any suitable display arrangement and the specimen signature may be declared as a false signature. Alternatively, this may be indicated and another specimen signature may be called for. Alternatively, the segments of the samples of the specimen signature in the register 62, 72 . . . (60+n) may be sequenced in the order in which they were generated, then applied to a specimen memory 94, FIG. 2a to be processed in the manner of currently known rubbery correlation processing.

The segments in the registers 62, 72 and (60+n) may be transferred to the specimen memory by applying the F signal output of the comparator 56 and the one-count signal of the state counter 92 to an And gate 96, (FIG. 2b). And gate 96 output is used to enable an oscillator 98 to start generating pulses. These are applied through an Or gate 99 to And gates 100, 102 and (100+n). These And gates are successively enabled in response to the count outputs of a read-out counter 110. The read-out counter is enabled to assume its one-count state in response to the output from an Or gate 112. Or gate 112 can produce an output in response to the output from an And gate 114, which is produced in response to an F input, and a one input from counter 92.

In the one count state read-out counter 110 enables the And gate 100 to apply the oscillator pulses received from oscillator 98 to an out shift pulser circuit 116, (FIG. 2a). This is a pulse shaping circuit whose output is used to shift out the digital samples in shift register 62 through the same end of the register as the one through which they were received. These digital samples are applied to an Or gate 118 (FIG. 2a), the output from which is applied to an And gate 120. And gate 120 is enabled in response to an F output from the comparator, whereby it will transfer the digital samples from register 62 into the specimen memory 94.

When register 62 has shifted out all of its digital samples, they will be followed by a zero. This is sensed by a zero sensor 122. It should be noted that when a digital sample has a zero value it is represented by a digit. This is done to enable the zero sensor to distinguish between a zero value digital sample and a zero which occurs after all the digital samples in the register have been shifted out. The output from the zero sensor 122 is applied to Or gates 124 and 141 (FIG. 2b). The output of the Or gate 124 is applied to the Or gate 112 which produces an output which is applied to the read-out counter 110 whereby its count is advanced to its second count state, 2.

Upon reaching the second count state, read-out counter 110 enables And gate 102 whereby pulses are applied to an out shift pulser 130. The outshift pulser circuit 130, enables register 72 to shift out the digital samples in a reverse order in which they were received. These digital samples are applied to the Or gate 118 and then through And gate 120 to the specimen memory 94, to be added to the digital samples received from the register 62. Another zero sensor 132 senses the zero following the last digital sample coming out of register 72, and applies its output to the Or gates 124 and 141, whereby the read-out counter 110 is advanced to its next count. In the manner described, read-out counter 110 enables the registers to shift out their contents. The next to the last count of the read-out counter enables And gate 100+n to apply pulses to out shift pulser 136. As a result, out shift pulser 136 shifts out the digital samples in register (60+n) to the Or gate 118 and then through And gate 120 they are stored in memory 94 following the previously stored digital samples. Zero sensor 138 applies an output to Or gates 124 and 141 and then through And gate 126 advances the read-out counter 110 to its nth count or last count. This last count is used to reset all circuits that require resetting.

In the event that less than all of the registers 62, 72 and (60+n) are used, which may happen, then provision must be made to determine when the last digital sample has been shifted out of the registers. To accomplish this, the total pen-up count of counter 36 is transferred, when gates 54 are enabled, into the buffer store 139, (FIG. 2b). Its output is applied to a subtractor circuit 140 which is enabled in response to the output of an Or gate 143. Or gate 143 provides an output in response to either the one or the two count outputs of the state counter 92. Subtractor circuit 140 will subtract, from the total pen-up count, the successive outputs of zero sensors 122, 132, and 138. The zero sensor outpus are collected by an Or gate 141, whose output is applied to subtractor 140. The output of subtractor circuit 140 is applied to an inverter 142. When subtractor circuit 140 output reaches zero, inverter circuit 142 provides an output which is applied to three And gates respectively 144, 184, 222. And gate 144, in the further presence of an F input, an output from one of the zero sensors derived from the output of Or gate 141, and a No. 1 count from the state counter, provides an output which is used to reset counters 110 and 92 and all other circuits used thus far, to their starting state. Thereafter, the specimen signature digital samples stored in the memory 94 and the template signature digital samples stored in memory 84 may be processed for correlation in the manner described, for example in the previously mentioned application Ser. No. 681,118 now U.S. Pat. No. 4,040,012. The reason one more zero sensor output is required is because when a signature is finished no pen-down signal after a pen-up signal occurs, which is required to actuate the pen-up signal counter. Thus, the pen-up counter total count is one less than the number of segments and one less than the number of registers storing those segments. When the zero sensor of the last register holding a segment produces an output, And gate 144 produces a reset output.

When the output of comparator 56 is true (T), this T output is applied to the Or gate 90 which drives the state counter 92 to its one count state. The one count of this counter and the T output of the comparator circuit 56 are used to "normalize" the contents of registers 62, 72 and (60+n). By that is meant that their contents are expanded or decreased until the number of digital samples in each segment equals the number of digital samples in the corresponding segment of the template memory. This is accomplished by respectively reading the digital samples constituting the specimen signature segments out of the respective registers 62, 72 and (60+n) at rates determined by the number of digital samples taken in each of the respective segments. The outputs of each of the registers, which are converted to analog signals are then sampled at a rate determined by the number of samples taken of the corresponding specimen segment. These samples are digitized and then entered into normalizing registers respectively 152, 154, (152+n). It will be recalled that the numbers representing the number of samples for each segment of the specimen memory are stored in the respective buffer stores 52A, 52B, 52N, and the digital numbers representing the numbers of samples taken from each corresponding segment of the template signature are stored in the respective template buffers 88A, 88B, 88N. (FIG. 2B)

Buffer stores 52A,52B,52C have their outputs connected respectively to respective gates 157A,157B,157N. These gates are sequentially enabled, in response to the 1, 2 . . . N counts of counter 110, to apply the buffer store outputs to an Or gate 158A. The Or gate output constitutes one input to a divider 158B.

Template buffer stores 88A, 88B, 88N respectively are connected to respective gates 161A, 161B, 161N. These gates are sequentially enabled by the 1, 2 . . . N output of a counter 166. The outputs from these gates are applied to an Or gate 158C, whose output comprises the second input to divider 158B. The divider divides the number received from Or gate 158A by the number received from Or gate 158C. The output of the divider is applied to a multiplier 158D to be multiplied by a voltage from a voltage source 158E.

An oscillator 160, when enabled as will be hereinafter described, will cause the registers 152, 154, 152+n to shift in the signals being received from the respective registers 62,72,62+n. The voltage controlled oscillator 158, when enabled, causes the respective registers 62, 72,62+n to shift out their contents at a rate determined by the oscillation rate of the voltage controlled oscillator, which is determined by the voltage received from the multiplier 158D. Were the fixed voltage from source 158E applied to voltage controlled oscillator 158, it would oscillate at the same frequency as oscillator 160. By dividing the number of specimen samples, by the number of template samples and multiplying the result by the fixed voltage, a voltage is obtained, which, when applied to the voltage controlled oscillator 158 results in the registers 152,154,152+n deriving from registers 62,72,62+n the same number of samples as there are in the template segments.

For example, assume that there are 10 template samples in a segment and 15 specimen samples in a corresponding specimen segment. Assume that the fixed voltage is one volt. Then, the voltage controlled oscillator 158 will provide an output frequency which is 1½ times the frequency used to drive the normalizing register. Thus when, for example, register 152 and 62 are simultaneously operated and register 62 shifts out its contents at 1½ times the frequency which register 152 shifts in any input, register 152 will only ingest 10 specimen samples from all 15 specimen samples and the specimen segment is then normalized.

Voltage controlled oscillator 158 is enabled to oscillate in response to a one count of state counter 92 and a T signal which are applied to And gate 159. Oscillator 160 is enabled to oscillate also in response to a one count of state counter 92, which is applied to an And gate 167, whose output is applied to an Or gate 168. The output of Or gate 168 enables oscillator 160 to oscillate.

The output of the voltage controlled oscillator 158 is applied to the Or gate 99. The output of the Or gate 99 is applied to the respective And gates 100, 102 and (100+n). These And gates are sequentially enabled in response to the count outputs of the read-out counter 110.

The T output of the comparator 56, is applied to a delay circuit 163 (FIG. 2B). The delay output from delay circuit 163 is applied to the Or gate 112 whereupon read-out counter 110 is advanced to its one-count state. The delay is to enable the oscillators 158 and 160 to attain their steady oscillation states after being enabled. And gate 100 applies the oscillations received from the voltage-controlled oscillator 158 to the out shift pulser 116. The register 62 now commences to transfer out the digital samples received from the beginning of the specimen signature up until the first pen-down signal occurrence.

The output of the Or gate 112 (FIG. 2B) is also applied to an And gate 165, which, in the presence of a T signal applies the signals received to an Or gate 164.

The output from Or gate 164 advances the count of a read-in-out counter 166 to its one state. Thereby, in the presence of a T signal, counter 166 advances together with counter 110. It may have the same count capacity as counter 110, and also has, for the purpose of enabling a normal data read-in to the normalizing registers, an And gate assigned to each count output, respectively 170,172,(170+n). These respective And gates receives as a second input, oscillations from oscillator 160. These And gates have their outputs respectively connected to in shift pulser circuits respectively 180,182,(182+n). These in shift pulser circuits will sequentially receive the oscillations from the oscillator 160 through the respective And gates 170,172 and (170+n) as the read-in-out counter has its count advanced.

The output of register 62 is applied to a digital to analog converter 62A. The output of the digital to analog converter is applied to a sample and hold circuit 62B which provides an output which holds the last output of the digital to analog converter 62A. A gate 62C is enabled to sample the output of the sample and hold circuit each time a pulse is received from the oscillator 160. The gate 62C output is applied to an analog to digital circuit 62D, which converts the analog signal to digital form. The pulse from oscillator 160 is also applied to the in shift pulser circuit 180 whereby the digital output of the analog to digital converter 62D is entered into shift register 152.

In view of the fact that the voltage controled oscillator 158 and out shift pulser 116 cause shift out of the stored samples of a specimen signature segment at a rate which is proportionately increased or decreased relative to the rate at which oscillator 160 and in shift pulser enable sampling of this output by the normalizing register, which proportional increase or decrease is determined by the number of samples in a specimen segment divided by the number of samples in a corresponding template segment, the normalizing register will contain, at the time that the transfer from register 62 is terminated at pen-up time, the same number of samples of the specimen signature segment as were contained in the corresponding template signature segment, and further these samples are derived from locations which are spaced equally apart from one another over the entire specimen signature segment. Thus the specimen signature segment has been normalized, i.e. expanded or contracted to the same size as the template signature segment. The circuits 62A, 62B, 62C and 62D serve to provide an interpolation function when the frequencies at which registers 62 and 152 are shifted are not integrally related.

When zero sensor 122 senses the end of the segment stored in register 62, it applies an output to Or gate 124. The output of this Or gate is applied, through Or gate 112 to advance counter 100 to its second count state, and the output from Or gate 112 is applied, through And gate 165 and Or gate 164, to drive the counter 166 to its second count state.

The second count states of counters 110 and 166 besides respectively enabling And gates 102 and 172, enables gates 157B and 161B to resepctively apply the contents of buffer stores 52B and 88B to divider circuit 158B through respective Or gates 158A and 158C. Out shift pulser 130 causes register 72 to shift out its contents at a rate determined by the output of voltage controlled oscillator 158. These are transferred to normalizing register 154 through analog to digital circuit 72A, sample and hold circuit 72B, gate 72C and analog to digital circuit 72D, at a rate determined by the output of oscillator 160. Thus the operation of the circuits on the digital samples of the second segment of the specimen memory is the same as described for the digital samples of the first segment, which results in storing a normalized second specimen in the normalizing register 154. Zero sensor 132 produces an output at the end of the transfer out from register 72 of the second segment. This output advances counters 110 and 166 to their third count.

From the foregoing it should be clear how each segment of the specimen signature is normalized in turn and transferred to a normalizing register.

The subtractor circuit 140 and the inverter circuit 142 function in the manner previously described to subtract from the number of pen-downs, outputs from the respective zero sensor circuits 122, 132 and 138, whereby when these are equal, the inverter 142 is enabled to provide an output. The inverter output is applied to an And gate 184. This And gate is enabled in response to the output of the last zero sensor, a T input, and a one input from state counter 92. The output of this And gate is applied to the Or gate 90 whereby the state counter 92 is advanced to its number two-count state.

The two-count state of the state counter enables the transfer out of the contents of the normalizing registers, in the sequence received, into the specimen memory. The two-count is also applied to Or gate 143, whereby subtractor 140 is enabled to perform another subtraction.

The output of the And gate 184 is used to reset the read-in-out counter 166 to its first count state. Three And gates respectively 192, 194 and (192+n) are respectively enabled in response to the first, second, nth, outputs of the read-in-out counter 166. When they are enabled, they can pass oscillations from the oscillator 160. This oscillator is enabled by the two-count output of the state counter 92, which is applied via Or gate 167.

The outputs of And gates 192, 194 and (192+n) respectively, are applied to out shift pulsers 200, 202, (200+n). The normalizing registers will, in response to the out shift pulser signals sequentially shift out their contents into the specimen memory. Their outputs are applied to an Or gate 204 the output from which is applied to an And gate 206. This And gate is enabled in the presence of a T input as well as a two count from the state counter. The output of the And gate 206 is thereafter applied to the specimen memory 94, and stored therein. Such storage may be spaced or segmented in accordance with the segments of the specimen signal indicated in response to the pen-up signals. The memory may be instructed to do this in response to the count outputs from the read-in-out counter 166, which will occur upon the end of the output from each of the respective normalizing registers.

The read-in-out counter is now sequenced in a similar manner to the previously used sequencing technique. A zero sensor 210 is connected to the output of normalizing register 152. A zero sensor 212 is connected to the output of the normalizing register 154. A zero sensor (210+n) is connected to the output of normalizing register 152+n. The outputs of these three zero sensor circuits, when they sense a zero, which occurs when the last digital sample has been transferred out of the respective normalizing registers, are applied to the Or gate 164 the output from which advances counter 166.

The subtractor circuit 140, and the inverter circuit 142 serve the same function as they did previously, to indicate when the contents of all of the normalizing registers have been transferred to the specimen memory. This is achieved by applying the outputs of the respective zero sensors 210, 212, (210+n) to an Or gate 220. The total of the outputs of this Or gate is subtracted from the total number of pen-up signals which is maintained in the subtractor circuit 140 by the output of buffer store 139. When the subtractor circuit output reaches zero again, the inverter 142 provides another output to an And gate 222. This And gate is enabled by a T input, by a last zero sensor output, and the two-count output of the state counter, whereby its output can be used to reset the system for the purposes of being used again.

If it is desired to insert special separation signals at the locations of the occurrences of pen-ups in the sequence of digital samples being supplied to the specimen memory 94, then this can be done by the circuit arrangement shown in FIG. 3. The outputs from the zero sensors 210, 212, and (210+n) are applied to an Or gate 230. Each time an output is obtained from this Or gate a pen-up signal generator 232 applies a special pen-up signal to an Or gate 234. The other inputs to the Or gate 234 constitute the successive outputs from the normalizing registers 152, 154 and 152+n. The output of the Or gate 234 is then entered into the specimen memory. The indicated pen-up signals may be signals indicative of the beginning and the end of the particular specimen signature signals which may be used in a system, such as is described in the previously indicated applications, Ser. No. 68,118.

As shown in FIG. 4, the specimen memory system 94 and the template memory system 84 may now be connected to correlation circuits 236 for the purposes of comparison. Since the specimen signature segments have been stretched or reduced in length, as the case may be so that they are now equal to the template signature segments, and since both signatures have their segments aligned, the processing of these signatures for the purposes of the correlation comparison, performed by the correlation circuits 236 is very simple. All that is required is direct correlation, or a translation, or, a shifting of the signals of one signature may be made with respect to the other for the purposes of searching for a best fit. This may be done by recording the signals on two tapes and successively displacing these tapes, or may be done directly from the digital signals in the manner described in detail in the indicated application Ser. No. 68,118. Alternatively the correlation processing may be done using any of the other, known numerous correlation techniques, such as subtracting each digital sample of the specimen signature from the corresponding digital sample of the template signature segments, and adding the absolute value of each such difference, etc. In any event, the correlation circuit outputs will provide a true or false indication to an indicator 238.

The processing of the X digital samples which has been described and shown in FIGS. 2A and 2B is also carried out with the Y and P signals. This may be done simultaneously with the X signal processing by duplicating the circuits of FIGS. 2A and 2B for Y and P, or the Y and P digital samples may be stored and then successively processed after X digital sample processing, by the one set of circuits.

The processing of the template signature signals only requires their breakup into segments between landmarks, which is done by transferring the segments into registers 62, 72 and (60+n), counting the samples in each segment, and counting the number of landmarks, respectively handled by counters 40 and 36. This data is then transferred into the template memory at a predetermined address, to be available for read out when required for correlation. The techniques for transfer into memory are known quite well and thus need not be described here.

By the process described, of normalizing segments of a specimen signature signal between landmarks, which correspond to landmarks between segments of the template signature signal, the process of correlation is made simpler. While "pen-ups" have been used as landmarks, other landmarks may also be used, without departing from the scope and spirit of this invention.

The particular sample normalization process and means were described herebefore for explanatory purposes only, without intending to limit the invention thereto. It should be apparent that other arrangements may be employed to accomplish the sample normalization. In general, the normalization can be viewed as a process, whereby the number of samples in a specimen segment is made equal to the number of samples in the corresponding template segment, with the values of the samples in the normalized specimen segment being a function of the sample values in the original specimen segment.

This aspect may be summarized in connection with several examples, presented numerically in FIG. 5. Therein columns 1–4 from left to right represent one example, and columns 5–8 a second example. Let it be assumed that a template segment contains 11 samples (cl. 1) and that the corresponding specimen segment, before normalization, contains 16 samples (cl. 2) of values, as shown in column 3. By the normalization, the number of samples for the specimen segment is reduced to equal that of the template segment, i.e., 11 (cl. 4). The values however of these 11 samples are selected, based on the original values in the specimen segment before normalization. In the particular example, the values of the first and last (11th) normalized samples are made equal to the values of the first and last (16th) specimen samples of the non-normalized segment, e.g., 2 and 8. The values of the other 9 samples in the normalized segment depend on the values of the other 14 samples in the non-normalized segment.

Columns 5–8 are used to represent a normalization example, wherein the template has 16 samples (cl. 5) and the non-normalized specimen segment has only 11 samples (cl. 6), of values as shown in column 7. The normalized specimen segment is increased to 16 samples, with values as shown in column 8, based on the values of the 11 samples of the non-normalized specimen segment.

In the particular example, instead of the second sample of value 4 in the non-normalized segment, two samples are inserted in the normalized segment of values, which depend on the value 4 of the second sample and the values of 2 and 5 of the adjacent samples. In the example the value of the second sample in the normalized segment is (4+2)/2=3, while that of the third sample is (4+5)/2=4.5. Thus the value 4 of the sample to be replaced and the values 2 and 5 of the adjacent samples are used to provide the values of 3 and 4.5 for the samples in the normalized segment.

Since the number of samples in a template segment and the corresponding specimen segment are available, such as in buffer stores 88A and 52A (FIG. 2b) and the values of the non-normalized specimen segment are in a register, like 62, it should be appreciated that such normalization can be accomplished by those familiar with the art. For example an arrangement, as shown in FIG. 6 may be used. Therein elements like those previously described are designated by like numerals. In FIG. 6 registers 62 and 152 are shown as memories with storage bytes or cells S1–Sn.

For the particular example, represented in columns 1–4 in FIG. 5, based on the number of template segment samples of 11 in buffer store 88A and the number of specimen segment samples of 16 in buffer store 52A, digital processor 300 transfers the value 8 in S16 of register 62 to S11 of normalizing register 152, while the value 2 in S1 of 62 is transferred to S1 of 152. The other 14 values in S2–S15 of 62 are then processed by processor 300 to form 9 values which are loaded into S2–S10 of 152. Once the normalization is completed it is transferred to the specimen memory system 94 (See FIG. 2a). After the normalization of one segment is completed the processor 300 may be used to normalize the next segment. Clearly, if desired with a plurality of processors 300 normalization of a plurality of segments may be performed in parallel.

Herebefore, when discussing the case wherein the number of landmarks in the template and specimen signatures is not the same, i.e. comparator 56 (see FIG. 2a) produces a false (F) output, several alternatives, which may be followed, were presented. It should be appreciated that in such a case, i.e. unequal number of landmarks, other alternatives may be followed. For example, the template memory 84 may store several different templates for signatures for the same person so that the specimen signature may be compared with each of them.

Another possible alternative may be followed when the difference in the number of landmarks in the two signatures (specimen and template) is small, e.g., one. In such a case the difference of one may be ignored and the segments normalized as herebefore explained. This aspect of the invention may best be described in connection with FIGS. 7a and 7b, which are assumed to represent samples and segments of a template and specimen signature, respectively.

The template signature is assumed to include four segments G1–G4, separated by three landmarks L1–L3 and an end of signature signal 310. The short vertical lines are assumed to represent samples. On the other hand, the specimen signature (FIG. 7b) is assumed to consist of five segments G1–G5 separated by four landmarks L1–L4 and the end of signature signal 310. Clearly in such a case the number of landmarks is not the same. Thus, the comparator 56 would produce a false signal.

In accordance with this aspect of the invention if the landmark number difference is small, e.g. one, the number of samples in each segment of the signature with the larger number of landmarks is checked. If a segment is found with a very small number of samples, one of the landmarks, defining the limits of that segment, is ignored. The small number of samples of the short segment may be discarded or regarded as being part of the preceeding or the following segment. A small number of samples in a segment would occur when a person raises the pen to dot an i or cross a t.

In the particular example the specimen signature has one extra landmark. Thus the number of samples in each segment is checked. Segment G3 is assumed to include 2 samples. Thus either landmark L2 or L3 may be ignored. The two samples in segment G3 may be ignored or added to those of segment G2, in which case L2 is discarded, or to G3 of the specimen signature. To which segment the sample is added may be determined by comparing the number of samples in the corresponding segment of the other signature, such as the template, so that corresponding segments of the two signatures have closer numbers of samples.

In the particular example the two samples of G3 of the specimen signature may be added to G2 so that the number of samples is closer to that of G2 of the template signature or to the samples of G3 of the specimen signature so that the total sample number is closer to the sample number in G3 of the template signature. Such a procedure would minimize the likelihood of regarding a signature as false, merely because the signer raised the pen one extra time for a very short writing period, e.g., raising the pen to dot an i.

It should be appreciated that the invention is not intended to be limited to signature verification only. That is to determine whether a specimen signature matches one or more specific template signatures written by the specimen signature writer. The invention may be used for recognition purposes as well. For example, the specimen signature may be compared with each of the template signatures which may be associated with different signers or written indicia to recognize, i.e., identify the written signature. For example, assuming that the specimen signature is a chinese character it may be compared with each of many templates of chinese characters to recognize or identify the written character when it best correlates with one of the chinese characters' templates. The invention is highly suitable for such recognition since chinese characters are formed by several and in some cases many separate strokes, thus containing many landmarks. However as previously pointed out the invention may be used to great advantage to verify or recognize any signal train characterised by landmarks. As used herein the term verification is intended to include recognition as well.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a system wherein a first train of signals having landmarks is to be correlated with a second train of signals having analogous landmarks, the method of segmenting each train of signals into segments and normalizing corresponding segments, the steps comprising:

segmenting the first train of signals into segments, including a first segment which includes the signals from the start of said first train to the first landmark, and a last segment which includes the signals from the last landmark to the end of said first train;

storing the signals in each segment of said first train;

counting the number of landmarks in said first train;

segmenting the second train of signals into segments including a first segment which includes the signals from the start of said second train to the first landmark thereof, and a last segment which includes the signals from the last landmark to the end of said second train;

storing the signals in each segment of said second train;

counting the number of landmarks in said second train;

comparing the total number of counted landmarks in said first train with those in the second train and producing a signal indicative whether the numbers are equal or not; and when said signal indicates that the two numbers are equal, normalizing each segment of said second train by varying the number of signals therein to equal the number of signals in the corresponding segment of the first train, with the values of the signals in the normalized segment being a function of their values in the corresponding non-normalized segment of the second train.

2. A system as described in claim 1 wherein the signals in each train are sampled at a selected rate to form samples which are stored for each segment, and wherein the normalization is performed by normalizing each segment of the second train by varying the number of samples in the segment to equal the number of samples in the corresponding segment of the first train with the values of the samples in the normalized segment being a function of their values in the segment before normalization.

3. In a system as described in claim 2 wherein when comparing the number of landmarks in the two trains the difference between the landmarks' numbers is only one, the method further includes the steps of determining whether any of the segments of the train with the greater number of landmarks contains a segment with a number of samples which does not exceed a preselected number, and when such a segment is determined to be present, deleting one of the landmarks, defining one of the segment's limits, prior to normalizing the segments of said second train.

4. In a system as described in claim 3 wherein the signals of said first train of signals represent force signals, produced along a selected axis as a first indicium is written, and the signals of said second train represent force signals produced along said selected axis as a second indicium is subsequently written.

5. A system as described in claim 1 wherein the signals of said first train of signals represent force signals, produced along a selected axis as a first indicium is written and the signals of said second train represent force signals, produced along said selected axis as a second indicium is subsequently written.

6. A system as described in claim 5 wherein the signals in each train are sampled at a selected rate to form samples which are stored for each segment, and wherein the normalization is performed by normalizing each segment of the second train by varying the number of samples in the segment to equal the number of samples in the corresponding segment of the first train with the values of the samples in the normalized segment being a function of their values in the segment before normalization.

7. In a method of verifying the correlation between a written specimen indicium with a previously written template indicium wherein both indicia have landmarks as there are written, the steps comprising:

for the template indicium, generating a first set of n trains of signals as the template indicium is written, n being an integer not less than one, where the signals in the trains represent force signals along n selected axes as the template indicium is written;

sampling the signals in each of said n trains at a selected rate to provide signal samples;

in each train detecting the landmarks therein and segmenting the samples thereof into sample segments;

for each train producing a number which equals the number of detected landmarks in the train;

for the specimen indicium;

generating a second set of n trains where the signals in the n trains represent force signals along said n selected axes, each train in said second set having a corresponding train in said first set for force signals along the same axis;

sampling the signals in each train of said second set at said selected rate to provide signal samples;

in each train of the second set detecting the landmarks therein and segmenting the samples into sample segments, for each train in said second set providing a number equaling the number of detected landmarks in the train, comparing the numbers of landmarks in at least two corresponding trains in the two sets and when they are equal;

normalizing each segment of the train in the second set with respect to the corresponding segment of the corresponding train in the first set, the normalization comprising the step of varying the number of samples in each segment to equal the number of samples in the corresponding segment, the values of the samples in the normalized segment being a function of the values of the samples in the segment before normalization.

8. A method as described in claim 7 wherein $n > 1$.

9. A method as described in claim 7 wherein each landmark represents a break in the continuous writing of the indicium.

10. A method as described in claim 7 wherein each indicium is a written signature of a signor and wherein each landmark represents a break in the continuous writing of the indicium.

11. A method as described in claim 10 wherein $n > 1$.

12. In a system wherein a template indicium, which is generated is to be correlated with a subsequently generated specimen indicium, and said generated indicia have natural landmark, occurring therealong as they are being generated, a system for normalizing as well as segmenting the lengths of the indicia between landmark comprising:

for said template indicium;

means for generating a train of samples, a variable of said template indicium as it is generated;

means for detecting each of natural landmark in said train as the template indicium is being generated and producing a landmark signal, means for adding the number of landmark signals to produce a landmark total, means for separating the samples in said train in response to the landmark signals, into segments, each segment comprising the samples generated between landmark signals;

means for counting the total number of samples in each segment;

for each specimen indicium;

means for generating a train of samples representing a variable of said specimen indicium as it is generated;

means for detecting each natural landmark in said train as the specimen indicium is being generated and producing a landmark signal;

means for adding the number of landmark signals to produce a landmark total;

means for separating samples in said train, in response to the landmark signals, into segments, each segment comprising the samples generated between landmark signals;

means for counting the total number of samples in each segment;

means for comparing the template indicium train landmark total with the specimen train landmark total and producing a true signal if they are equal; and means responsive to said true signal, for altering the number of samples in successive segments of the train of said specimen indicium until they equal the number of samples in corresponding successive segments of the train of said template indicium.

* * * * *

UNITED STATES PATENT AND TRADEMARK OFFICE
CERTIFICATE OF CORRECTION

PATENT NO. : 4,190,820
DATED : February 26, 1980
INVENTOR(S) : Hewitt D. Crane et al It is certified that error appears in the above—identified patent and that said Letters Patent is hereby corrected as shown below:

On the cover sheet Item (73) Assignee should read

-- SRI International, Menlo Park, Calif. --

Signed and Sealed this

Sixteenth Day of September 1980

[SEAL]

Attest:

SIDNEY A. DIAMOND

Attesting Officer　　Commissioner of Patents and Trademarks